United States Patent [19]
Aiken

[11] Patent Number: 5,996,288
[45] Date of Patent: Dec. 7, 1999

[54] GEODESIC DOMES AND IMPROVED JOINTS THEREFOR

[76] Inventor: Ernest G Aiken, 4409 Vermont Ave., Fort Worth, Tex. 76115

[21] Appl. No.: 08/954,111

[22] Filed: Oct. 20, 1997

[51] Int. Cl.[6] .............................. E04B 7/10; E04B 7/08; F16B 7/00
[52] U.S. Cl. .......................... 52/81.3; 52/81.1; 52/81.2; 52/DIG. 10; 403/171; 403/176; 403/217
[58] Field of Search ...................... 52/81.3, 81.2, 52/81.1, DIG. 10, 655.1; 403/170–172, 176, 217, 219, 218

[56] References Cited

U.S. PATENT DOCUMENTS

| | | | |
|---|---|---|---|
| 3,114,176 | 12/1963 | Miller | 52/81.2 |
| 3,810,342 | 5/1974 | Scott | 52/81.3 X |
| 4,012,872 | 3/1977 | Stolpin | 52/81.3 |
| 4,720,947 | 1/1988 | Yacaboni | 52/81.3 |
| 4,796,389 | 1/1989 | Bini et al. | 52/81.3 X |
| 5,088,245 | 2/1992 | Anderson | 52/81.3 X |
| 5,289,665 | 3/1994 | Higgins | 52/648.1 X |
| 5,398,475 | 3/1995 | Kraus | 52/655.1 |
| 5,566,516 | 10/1996 | Beaulieu | 52/81.3 |

*Primary Examiner*—Robert Canfield
*Attorney, Agent, or Firm*—Christopher J. Whewell

[57] ABSTRACT

Disclosed herein are novel architectural joints for use in constructing geodesic domes. The joints disclosed are less costly to manufacture and are of increased strength over prior art joints. Through the use of the joints disclosed, construction of novel geodesic domes not found in the prior art is now possible.

15 Claims, 10 Drawing Sheets

GEODESIC DOMES AND IMPROVED JOINTS THEREFOR

BACKGROUND OF THE INVENTION

1) Field of the Invention

This invention relates to geodesic architecture including geodesic domes which are frequently used as permanent dwellings, backyard greenhouses, or portable shelters. This architecture is commonly configured in a semi-spherical framework or shell arrangement and is comprised of a multiplicity of linear structural strut members which are strategically connected to one another by an effective means.

The crux of this invention comprises a novel means by which the structural members are connected to one another. This new connective means allows convenient construction of conventional geodesic structures, as well as some heretofore unavailable.

2) Description of Related Art

Geodesic dome structures have been known for quite some time now. Although the number and type of polyhedra upon which geodesic domes may be based is large, it has heretofore been impossible to construct many of the possible structures owing to spatial constraints in the connecting means. Since increased strength and other utility-enhancing characteristics have been found to result from the use of particular geodesic configurations, it has been deemed desirous by the instant Inventor to provide a means for making possible their construction.

Typically, the structures which have been produced consist of structural support members and a means for connecting the support members to one another. One example of a connecting means so suited is described in U.S. Pat. No. 4,521,998 and comprises a hinge plate. Another connecting means is described in U.S. Pat. No. 4,203,265 which comprises a hub and strut. U.S. Pat. No. 4,194,851 discloses a universal hub for geodesic domes which comprises a wing nut and two metal plates. Other systems for connecting the strut members of geodesic domes to one another are described in U.S. Pat. Nos.: 3,908,975; 4,531,333; 4,901,483; 4,511,278; 4,236,473; 5,165,207; 4,308,698; 4,365,910; 4,905,443; 4,319,853; and 4,464,073.

Generally speaking, the most preferred prior art devices in the field to which the instant invention relates are of limited use, involve costly manufacturing processes, are time intensive with regards to both manufacture and use, and often comprise exotic shapes requiring special tooling for mass production. Further, prior art connecting means are limited in their use, i.e., they are not universal in capability and are by their spatial constraints limited in use as to the number of spanning links (struts) per connecting hub and to previously used conventional geodesic geometry. The prior art devices do not lend themselves well to rapid disassembly and hence convenient portability. The instant invention is an improvement over prior art rigid connection systems which are subject to breakage and/or bending under stress loads. The present invention discloses a flexible connection joint that provides unexpected rigidity when applied to a geodesic structure.

SUMMARY OF THE INVENTION

An object of the present invention is to provide a new and useful means for connecting the structural members of a geodesic dome structure.

It is a further object of this invention to provide a means for connecting structural members of a geodesic dome using readily available and low-cost materials.

It is a further object of this invention to provide a means for connecting structural members of a geodesic dome which is easier to assemble and disassemble than all prior art means.

It is a further object of this invention to provide structural members and a means for connecting them in the configuration of a geodesic dome utilizing no welding, and which produces a joint which is sufficiently flexible during assembly to prevent breakage of joint components. These and other objects of the invention shall become readily apparent to one of ordinary skill in this art upon reading and understanding the specification.

Since dome structures not disclosed in prior art are made possible through use of the instant invention, it is accordingly a further object still to provide novel geodesic dome structures.

The present invention provides a means whereby all geometric forms of geodesic dome structures may be conveniently constructed using wares constructed from readily-available materials. The domes constructed according to this invention are easier to assemble and disassemble than all prior art methods. No specialized equipment, welding, or other machining operations are required for the manufacture of domes according to this invention. Since the degree of machining is greatly reduced over the prior art, the overall cost of a given completed dome is greatly reduced than provided by the contrivances of the prior art.

The necessary components for producing geodesic dome structures according to the instant invention include generally a plurality of strut members which make up the dome itself, and the means for connecting the strut members to one another in the appropriate pattern to produce the desired dome structure. The connecting means may be described as including hubs which comprise hollow, cylindrically-shaped tubular lengths, which are provided with means adaptive for connection of the strut members in a cooperative pattern. The hubs of this invention are universal in their employ, and comprise locations spaced radially about their outside surfaces whereupon the struts are to be fastened.

The struts are generally shaped in the form of a rectangular solid, and are equipped with at least one threaded screw-type fastener having one end protruding from an end portion of the strut. The strut members may be constructed from materials which include metal, polymeric composites, wood, etc. The hubs have a plurality of specially-shaped slotted holes on their surface which allow for the insertion of the threaded fastener portions of the struts through the holes, and a lateral motion of the strut with respect to the hub in order to locate the struts into their desired positions. Into the ends of the strut members are cut either a v-shaped or circular groove coincident with the width dimension of the strut for increased structural integrity of the joint formed, which effectively stabilizes the strut with respect to the cylindrical surface of the hub to provide a synergistic locking effect. The link between a strut member and the hub is completed by either tightening a nut as in the case of when the threaded fastener is a bolt, or by simple clockwise rotation of a large wood screw when such is employed.

Upon assembly of all struts into the hubs, a geodesic dome is formed which has many uses, including use as a greenhouse, flower garden, or helicopter-assisted air-liftable housing structures.

BRIEF DESCRIPTION OF THE DRAWINGS

The reader of the specification hereof is now directed to consider the drawing sheets in which.

DESCRIPTION OF PREFERRED EMBODIMENTS

Figure 1:
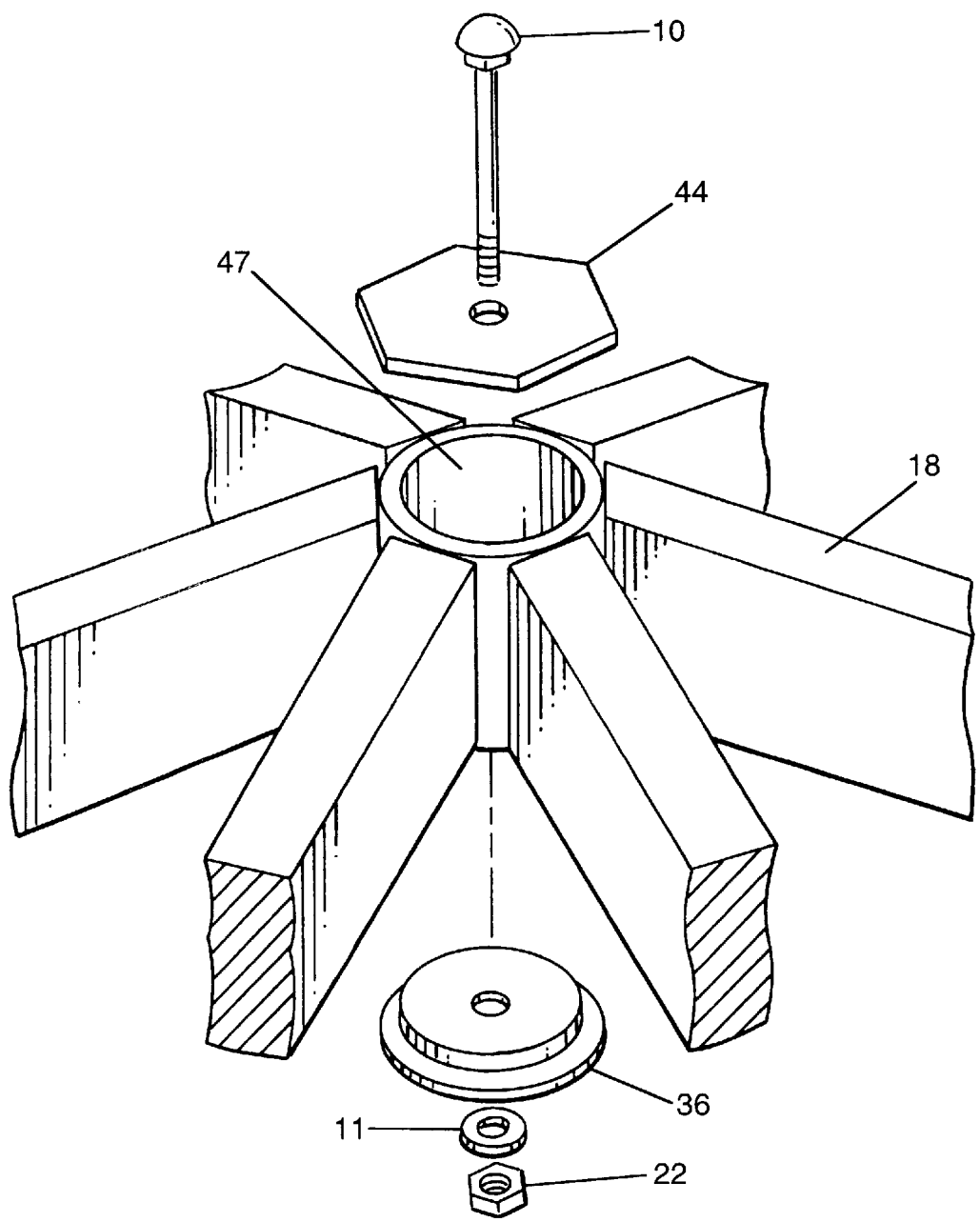
FIG. 1 shows a perspective view of one of the joints according to this invention.
Figure 2:
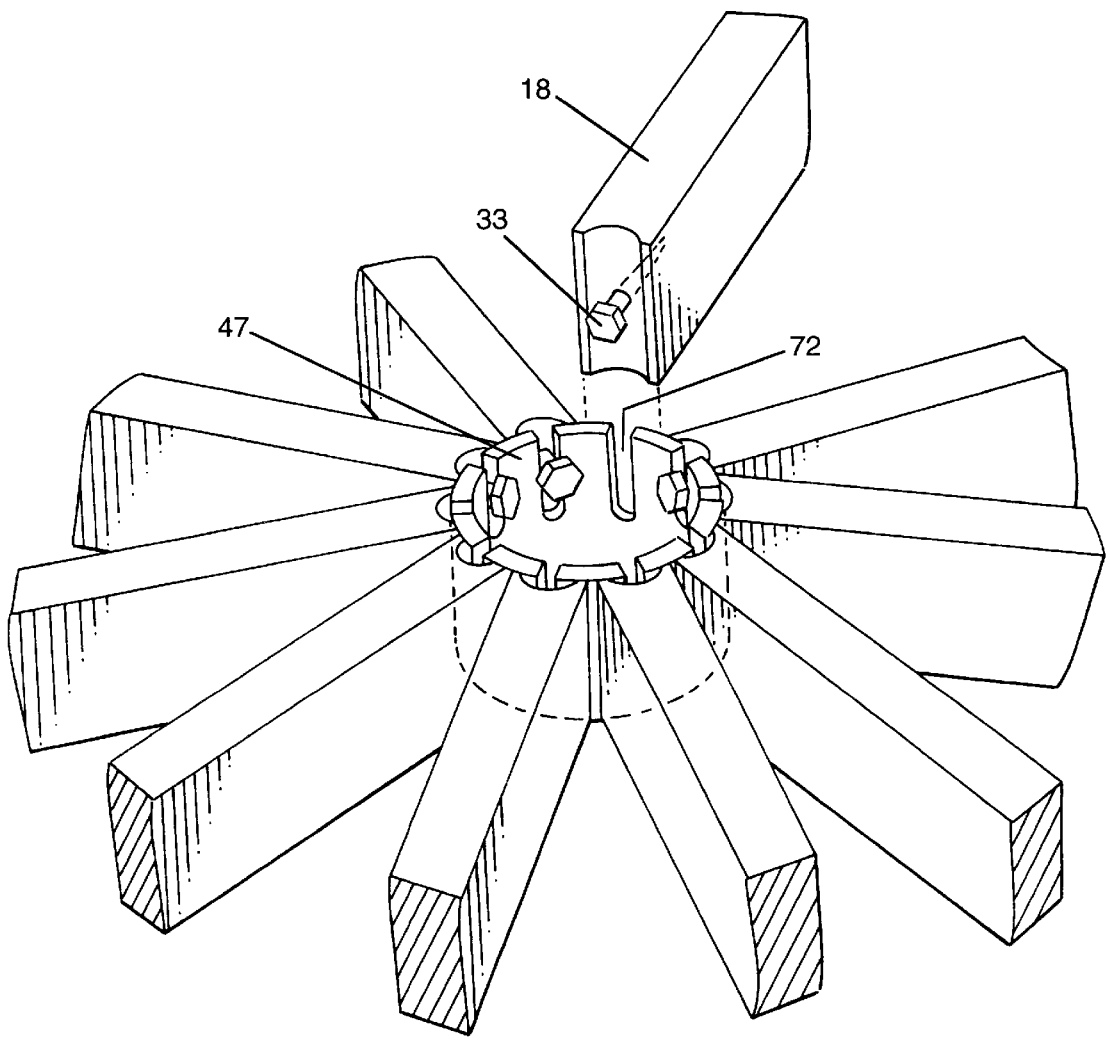
FIG. 2 shows a perspective view of cooperative interaction of the elements of a joint according to this invention.

This invention comprises an improved system by which the strut members of a geodesic dome structure are cooperatively connected to one another to form a joint having increased integrity over the prior art.

In order to produce a dome structure according to this invention, one needs to provide the struts and the hubs for the joints.

The Specialized Hub Means

The specialized hubs 47 of this invention comprise generally tubular lengths of hollow construction having a top portion 58, a bottom portion 53, and a wall portion 77. Although the hubs may be constructed of any convenient material including wood, various metals and alloys thereof, the hubs are preferably constructed from readily available polyvinyl chloride (PVC) or other tubing of standard specifications providing a hub diameter consistent with the quantity and size of struts comprising the joint. Preferably, cylindrically-shaped materials having an outer diameter of 3.5 or 4.5 inches, and having a standard wall thickness, preferably about 3/16, and a length convenient for the strut dimensions and overall size of the dome to be constructed, typically about 3 to 6 inches in length. Into the wall portion of the hubs are provided holes 66, 91 or slots 72 for receiving a fastening means which is attached to each strut member 18. The holes for receiving the fastening means are spaced radially about the surface of the hub itself. The holes may be circular in configuration, elongated, or they may preferrably be shaped like a keyhole 66. The keyhole configuration is beneficial when a bolt 51 or a woodscrew 33 is used as the fastening means. The woodscrew is partially threaded into the end of a particular strut member to the extent that a space equal to just slightly larger than the thickness of the hub is maintained between the head of the screw and the edge of the strut member. Subsequently, the head of the woodscrew is inserted into the round portion of the keyhole and slid into the channel portion of the keyhole, whereupon a joint of high integrity results from the woodscrew being tightened by just a couple of turns, thereby resulting in a substantial reduction of in-the-field labor.

Another embodiment of this invention is when the hub is fitted with a straight slot 72 which originates at one end of the hub. This embodiment may be used in the case when a wood screw is employed as just described, or in the case when the strut member has a machinescrew 51 protruding from its end. In such case, the threaded portion of the machine screw is inserted into the hub, the strut is held in its desired position and the fastener, a wing-nut 38 or other nut is engaged to the threaded portion of the strut, thus forming a joint of high integrity. In another embodiment, a plurality of fasteners analogous to 51 are employed to provide a joint having increased strength.

The Specialized Struts

The struts are preferably constructed of lumber stock and are preferably made from 2"×4" lumber, although the use of other sizes is well contemplated to be within the scope of this invention. The struts may be either treated or untreated wood. Other strut materials may be used including but not limited to plastics, and metals such as stainless steel, aluminum, copper, zinc, etc. or alloys thereof.

Figure 3:
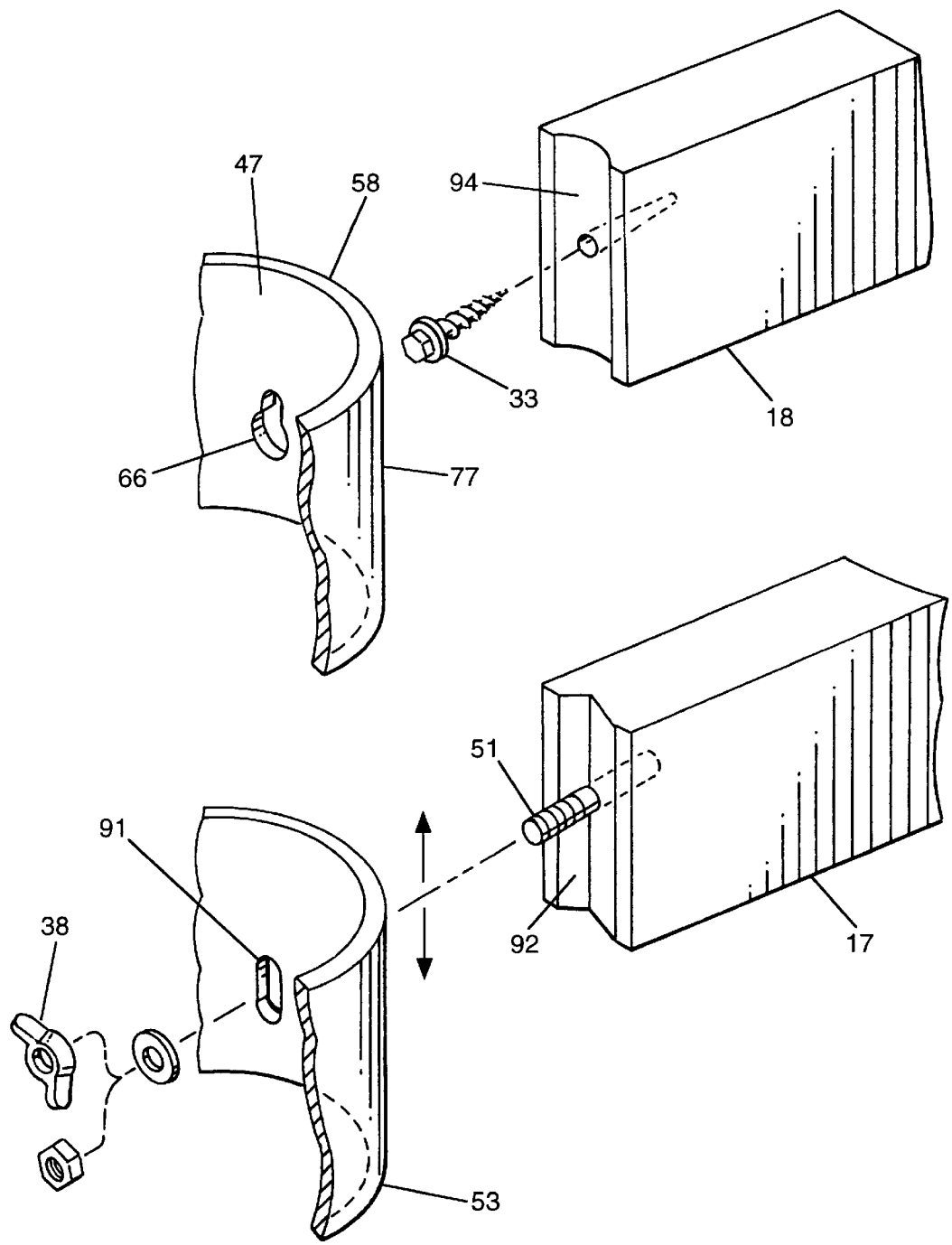
FIG. 3 shows a perspective view of two most preferred contours of the end portions of the strut members according to this invention.
Figure 4:
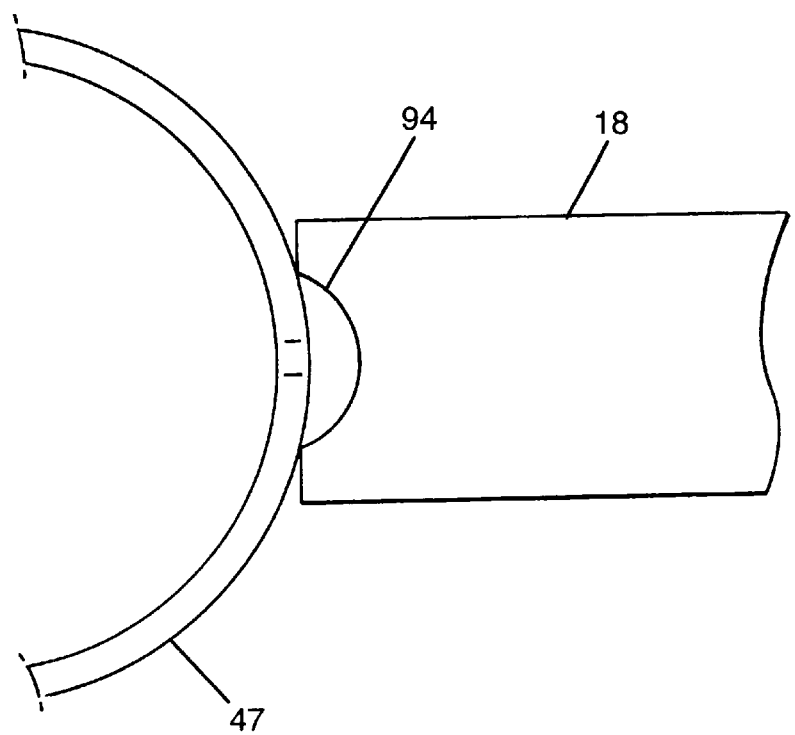
FIG. 4 shows a top view of the cooperative interaction between the strut members of this invention and the hub to which they are attached according to a preferred form.
Figure 4:
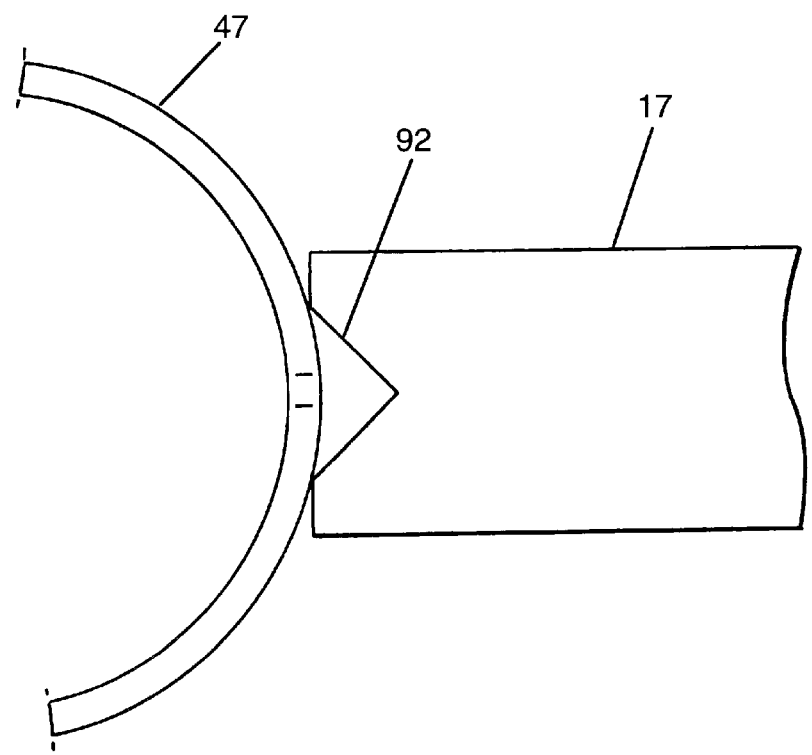

It has been discovered that a synergistic benefit is derived by machining into the edges of the strut members a v-shaped or a cup-shaped groove. Referring to FIG. 4, strut member 17 has a v-shaped groove 92 cut into it as also shown in FIG. 3. Similarly, strut member 18 has a cup-shaped groove 94 cut into it as also further shown in FIG. 3. The use of these grooves has been unexpectedly found to provide for a secure fitting of the strut on the hub when the bolt or nut is tightened, at the point of contact, with the unobvious advantage being that the struts do not tend to swivel or turn out of alignment under pressure which otherwise is found to occur in the absence of such provision. Thus, by this invention, the struts stay in place with no other attaching means. This results in greater latitude of movement during the constructions stage and a finished joint of increased overall strength, and hence a dome structure having superior strength overall.

The Specialized Hub Cover

Figure 5:
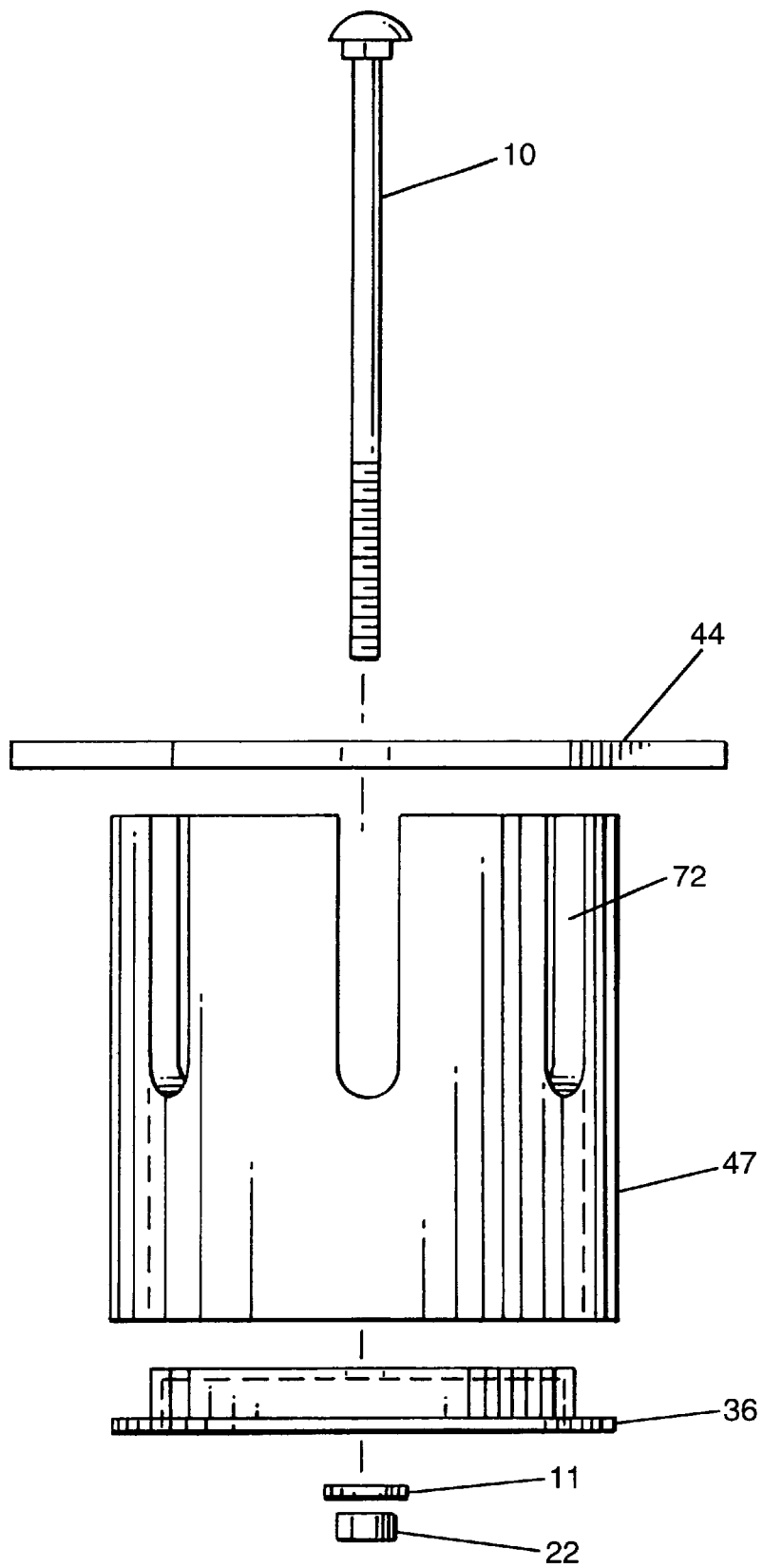
FIG. 5 shows a side view of one of the hubs of this invention and the arrangement of the cover portions used to exclude ambient weather elements from affecting structural integrity of the overall finished dome.

Referring to FIG. 5, this invention provides further for essential encapsulation of the resulting improved joint, thus providing a system which is substantially hermetically sealed from the elements of weather and hence of increased durational stability over all devices of the prior art. In this figure is provided cover portions 44 and 36 for the hub 47 which are held together by bolt 10, nut 22, and washer 11. The cover has a hole on its surface for the attaching of the covers by a fastening means which extends through the hub and covers as shown in the drawings. The covers may be constructed from any weatherproof plastic or metallic material with acrylic and aluminum being the most preferred materials. A conventional silicone-based or polyurethane sealer is preferrably used in conjunction with the cover portions.

Figure 6:
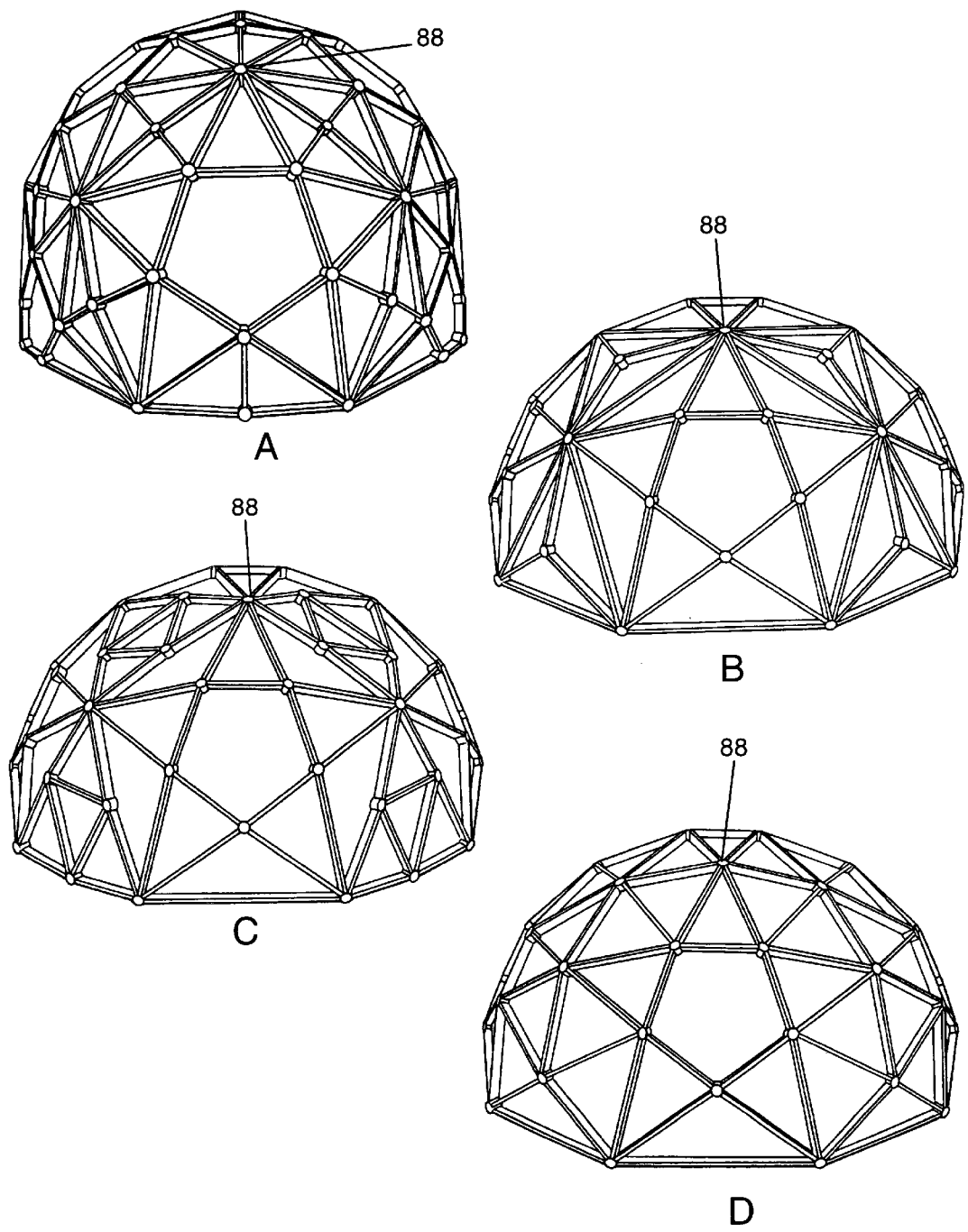
FIG. 6 shows various star domes produced according to this invention.
Figure 7:
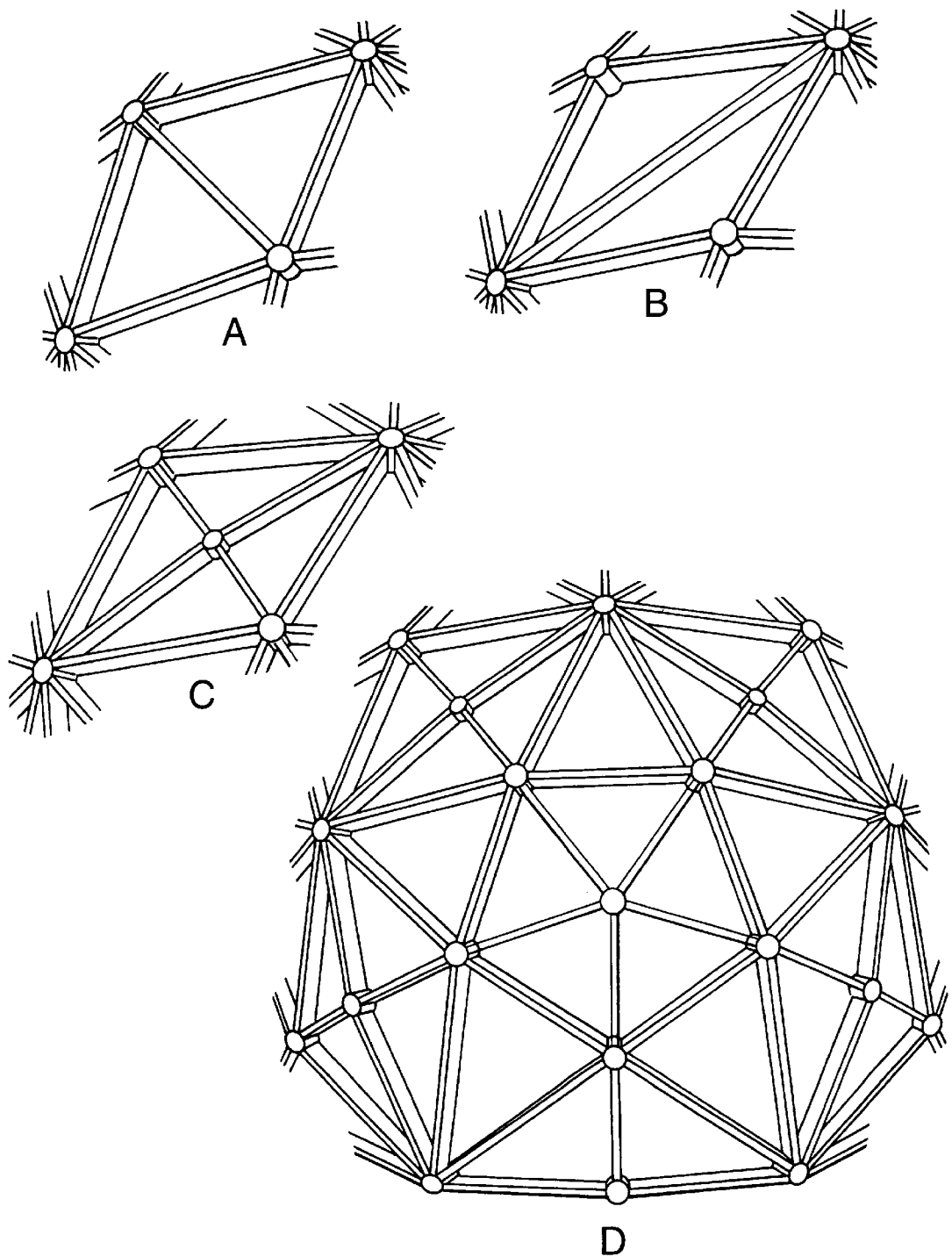
FIG. 7 shows close-ups of the geometrical arrangement of several dome portions producible according to this invention.
Figure 8:
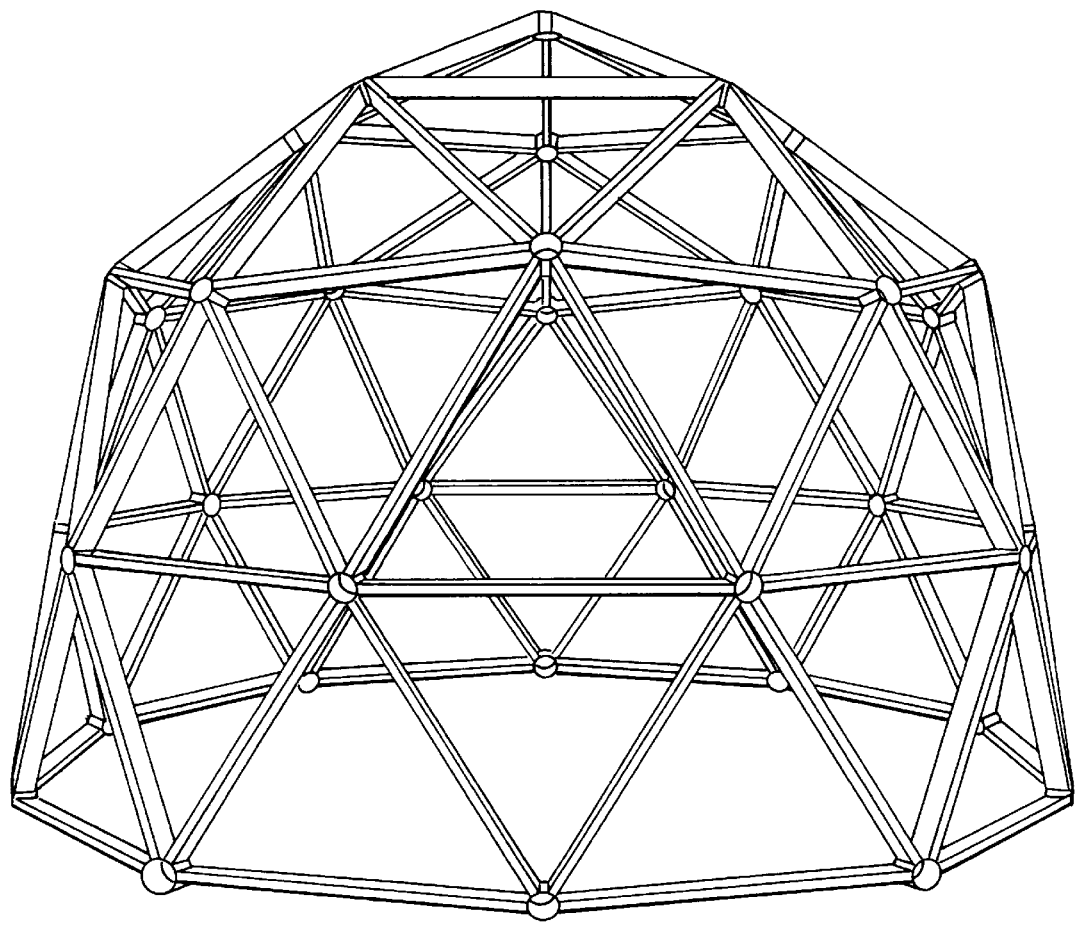
FIG. 8 shows a typical dome of prior art.
Figure 9:
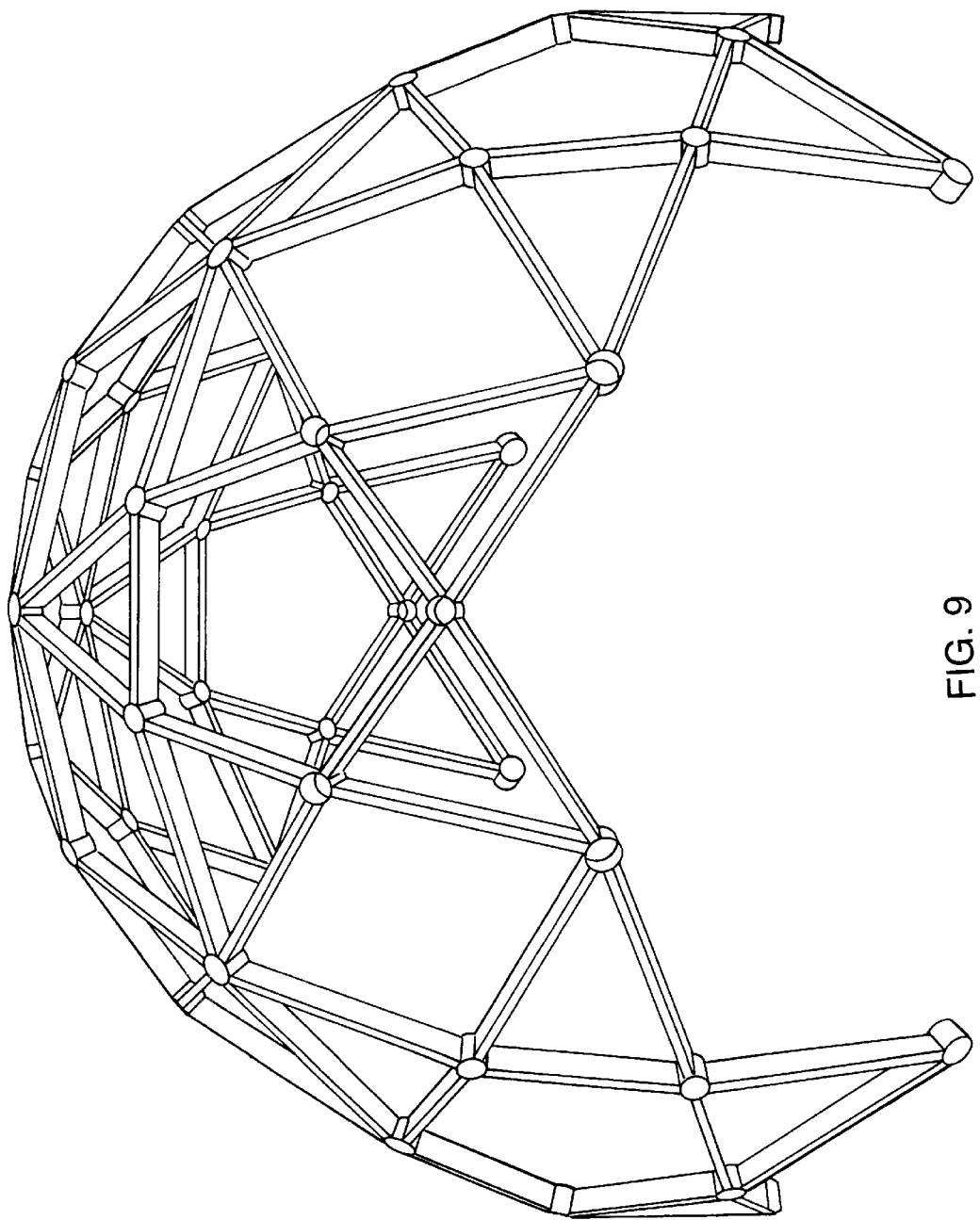
FIG. 9 shows an open star dome according to this invention.
Figure 10:
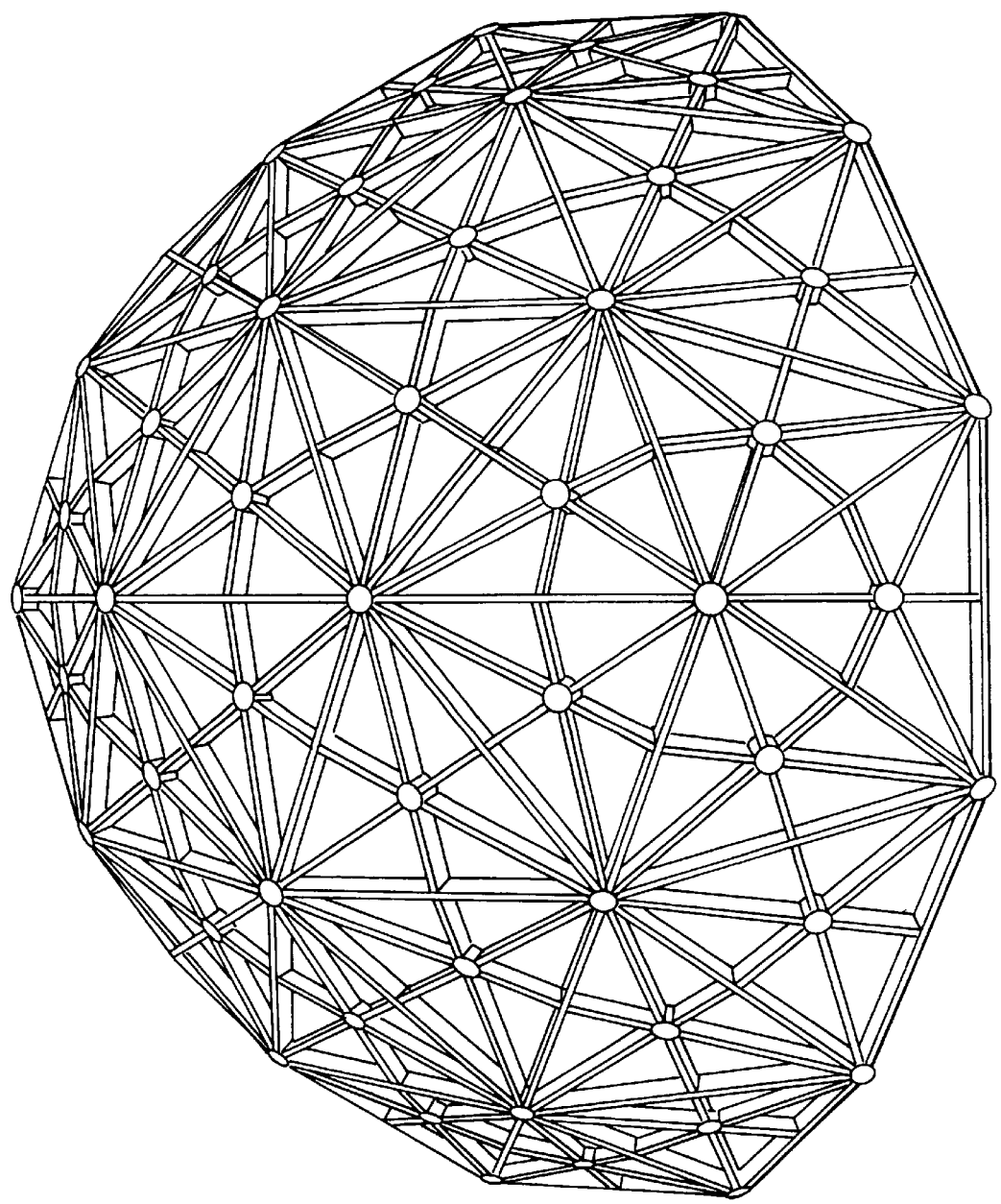
FIG. 10 shows a dome according to the instant invention which comprises 12 strut members which intersect at a single hub.

The star domes of this invention comprise a geodesic dome structure containing at least one pentagonal arrangement of strut members wherein each leg of a given pentagon is simultaneously a leg of an adjacent triangle on each pentagonal face, thus forming a five-pointed star. Domes containing such stars are depicted in FIGS. 6 A–E. The geometry employed in construction of each of these star domes differs somewhat from one another, and such is evidenced by the number of strut members intersecting at the hub labelled 88. The number of intersecting strut members at hub 88 in FIGS. 6 A–E are, respectively, 9, 10, 8, 6, and 9. No prior art contains configurations such as those shown, and particularly none having the overall physical integrity made possible by the improved joint of this invention.

A critical parameter affecting the structural integrity of geodesic domes of the type described herein is the triangle to hub ratio. The star domes are stronger structurally because they utilize more materials in relation to space, i.e., more struts per hub, and thus more triangles per surface area of a given dome when compared to conventional domes. This means that the resulting structures are capable of withstanding greater forces and may be constructed in sizes larger than possible by other means. Since the triangle to hub ration is greater with the star domes, there are on average, fewer joints present in these configurations. This translates to reduced manufacturing costsand reduced probability of failure.

I claim:

1. A novel architectural joint for use in geodesic dome structures which comprises:
    a) a hub means characterized as comprising a hollow cylindrical shell having a top portion, a bottom portion, wall portion, and an interior portion and including a plurality of holes disposed through said wall portion;
    b) a linear strut member characterized as having two end portions wherein a connective means is attached to at least one of said end portions;
wherein said strut member is joined to said hub means by said connective means being disposed through a hole in said hub, and wherein said plurality of holes is disposed radially about said wall portion, and wherein said strut member includes a v-shaped notch on at least one of its end portions.

2. The joint of claim 1 wherein said plurality of holes are disposed radially about said wall portion.

3. The joint of claim 2 wherein each said hole is shaped in the form of a keyhole.

4. The joint of claim 2 wherein each said hole is shaped in the form of an oval.

5. The joint of claim 1 wherein said connective means is selected from the group consisting of: wood screws, machine screws, or a nut and bolt combination.

6. A geodesic dome structure according to claim 1 wherein said strut member is shaped in the form of a rectangular solid.

7. The joint of claim 1 further comprising cover means attached to said top and bottom portions of said hub.

8. The joint of claim 7 wherein said interior portion is hermetically sealed so as to exclude the elements of ambient weather.

9. A geodesic dome structure which comprises the architectural joint of claim 1.

10. An architectural structure in the form of a geodesic dome which includes a pentagonal arrangement of linear strut members and five triangular arrangements of linear strut members wherein said triangular and said pentagonal arrangements share at least one common strut, thereby forming and including the shape of a five-pointed star into the geometry thereof, and wherein said pentagonal arrangement has no hub in the center of its interior.

11. An architectural structure in the form of a geodesic dome which includes a pentagonal arrangement of linear strut members and five triangular arrangements of linear strut members wherein said triangular and said pentagonal arrangements share at least one common strut, thereby forming and including the shape of a five-pointed star into the geometry thereof, and wherein said pentagonal arrangement has no hub in the center of its interior further comprising at least one joint which comprises:
    a) a hub means characterized as comprising a hollow cylindrical shell having a top portion, a bottom portion, wall portion, and an interior portion and including a plurality of holes disposed through said wall portion;
    b) a linear strut member characterized as having two end portions wherein a connective means is attached to at least one of said end portions;
wherein said strut member is joined to said hub means by said connective means being disposed through a hole in said hub, and wherein said plurality of holes is disposed radially about said wall portion.

12. The dome of claim 11 including at least one hub to which 8 strut members are joined.

13. The dome of claim 11 including at least one hub to which 9 strut members are joined.

14. The dome of claim 11 including at least one hub to which 10 strut members are joined.

15. The dome of claim 11 including at least one hub to which 12 strut members are joined.

* * * * *